(12) United States Patent
Hamamoto et al.

(10) Patent No.: US 7,155,327 B2
(45) Date of Patent: Dec. 26, 2006

(54) CONTROL APPARATUS FOR AN ELECTRIC POWER STEERING SYSTEM

(75) Inventors: Kyoji Hamamoto, Wako (JP); Yoshinobu Mukai, Wako (JP); Osamu Tsurumiya, Wako (JP); Hiroaki Horii, Wako (JP); Kazuhisa Watanabe, Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 87 days.

(21) Appl. No.: 10/681,893

(22) Filed: Oct. 9, 2003

(65) Prior Publication Data

US 2005/0065685 A1    Mar. 24, 2005

(30) Foreign Application Priority Data

Oct. 9, 2002    (JP) ............................. 2002-296604

(51) Int. Cl.
G06F 165/00    (2006.01)
H02P 7/00    (2006.01)

(52) U.S. Cl. .................. 701/42; 180/446; 180/410; 180/443; 701/41; 318/432; 318/430

(58) Field of Classification Search ................ 701/41, 701/42; 180/6.2, 79.1, 142, 446, 412, 443, 180/204, 410; 318/432, 293, 599, 430
See application file for complete search history.

(56) References Cited

U.S. PATENT DOCUMENTS 5,788,010 A    8/1998    Mukai et al.
5,844,387 A *  12/1998   Mukai et al. ............... 318/432
5,982,137 A *  11/1999   Endo ........................... 318/812
6,013,994 A *  1/2000    Endo et al. ................. 318/432
6,240,350 B1 * 5/2001    Endo ............................. 701/41
6,407,524 B1 * 6/2002    Endo et al. ................. 318/432
2002/0053481 A1* 5/2002  Itakura et al. .............. 180/446

FOREIGN PATENT DOCUMENTS

| EP | 0 522 466 | 7/1992 |
| JP | 07-196048 | 8/1995 |
| JP | 08-332969 | * 12/1996 |
| JP | 10-203383 | 8/1998 |
| JP | 3152339 | 1/2001 |
| JP | 2001-239947 | 9/2001 |

* cited by examiner

*Primary Examiner*—Jack Keith
*Assistant Examiner*—Ronnie Mancho
(74) *Attorney, Agent, or Firm*—Hamre, Schumann, Mueller & Larson, PC

(57) ABSTRACT

A control apparatus for an electric power steering system is provided, which controls a motor for applying assist steering torque to a steering line of a vehicle at least according to steering torque signal of the steering line, vehicle velocity signal and motor current signal. The control apparatus includes a target current controller for setting target current signal for driving the motor, a deviation calculator for computing a deviation between the target current and motor current signals, a deviation adjuster for adjusting the deviation with a variable gain according to the vehicle velocity signal, a proportional element for executing proportional control for the motor, an integral element for executing integral control for the motor and an gain adjuster for adjusting the gain according to a differential of the steering torque signal.

3 Claims, 6 Drawing Sheets

CONTROL APPARATUS FOR AN ELECTRIC POWER STEERING SYSTEM

FIELD OF THE INVENTION

The present invention relates to a control apparatus, which applies the power generated by a motor directly to a power steering system, thereby relieving the steering force required of a driver.

BACKGROUND OF THE INVENTION

An electric power steering system, which applies the driving force of a motor directly to a steering line so as to supply assist steering torque, can assist steering made by a driver. In the electric power steering system, an electric control unit (ECU) determines target current to be supplied to the motor according to steering torque, vehicle velocity and the like, making a comparison between the target current and actual current flowing into the motor. And a deviation, the result of comparison, which first experiences processing executed by a proportional and integral controller, is then supplied for controlling the motor. A control method of this type is reported in Japanese Published Patent Application 7-196048.

The ECU, which has a microcomputer for controlling the electric power steering system, executes current feedback so that a target current is in agreement with an actual current, in other words a deviation between these currents becomes zero. In a feedback loop including the ECU and microcomputer, an attenuator is employed so as to increase or decrease the deviation according to vehicle velocity, namely to make the response of feedback loop variable according to the vehicle velocity. In Japanese Patent No. 3152339 an attenuator of this kind is reported. The gain of attenuator is adapted to be higher as a vehicle runs fast so as to achieve better response and to be lower as the vehicle runs slow to restrict generation of noise, so that performance in terms of better response can coexist with commercial value associated with noise reduction.

Applicants have discovered that steering feeling is sometimes degraded due to lack of appropriate assist by a motor when sudden steering is made during low speed running of a vehicle. This phenomenon is attributed to the fact that the attenuator has a gain which is adjusted to be compatible for both conditions of low and high speed running. Also the applicants have discovered that the oscillation of motor current sometimes occurs if sudden steering is made during very low speed maneuvering or stopping of a vehicle when larger reaction force is exerted by a road surface. Though the oscillation lasts for a short period of time when sudden steering is being made, it possibly causes mechanical vibration, the frequency of which sometimes happens to fall in an audible range of man, thereby creating irritating noise to make a driver uncomfortable. This could lead to damaging of commercial value. Even if the oscillation does not develop so far, it is not desirable to create noise and vibration.

SUMMARY OF THE INVENTION

The object of the present invention is to provide a control apparatus for an electric power steering system, which is able not only to apply appropriate assistance for steering made by a driver but also to restrict generation of noise and vibration if sudden steering is made during low speed running of a vehicle.

Applicants conducted a strenuous study for this object and have brought the present invention to completion. The applicants have found that unsuccessful assistance during sudden steering or generation of noise and vibration is attributed to the insufficient response of a motor for sudden steering during lower speed running of a vehicle, in which greater reaction force is exerted by a road surface. The cause results from the fact that the gain of an attenuator is set to be low to improve quietness during low speed running of a vehicle when engine noise and wind noise are lower.

An aspect of the present invention is to provide a control apparatus for an electric power steering system, which controls a motor for applying assist steering torque to a steering line of a vehicle at least according to steering torque signal of the steering line detected by a steering torque sensor, vehicle velocity signal detected by a vehicle velocity sensor and motor current signal detected by a motor current detector. The control apparatus includes a target current controller for setting target current signal for driving the motor according to the steering torque signal, a deviation calculator for computing a deviation between the target current and motor current signals, a deviation adjuster for adjusting the deviation with a variable gain according to the vehicle velocity signal, a proportional element for executing proportional control for the motor according to the deviation, an integral element for executing integral control for the motor according to the deviation and an gain adjuster for adjusting the gain according to a differential of the steering torque signal.

The control apparatus described above, in which the gain is adjusted according to the vehicle velocity, can provide an appropriate response during high speed running and a quiet environment during low speed running of a vehicle. Furthermore, since the gain is adjusted according to a differential of steering torque, as a result of making sudden steering, the response of a motor is improved for the sudden steering. Improvement in the response of motor during the sudden steering provides appropriate assistance by the motor. The improvement, which restricts generation of the motor current oscillation during very low speed maneuvering of a vehicle, suppresses noise and vibration (mechanical vibration) caused by the oscillation.

Another aspect of the present invention is to provide a control apparatus, which has a feature that the gain adjuster is adapted to adjust the gain according to a differential of steering torque when the differential reaches equal to or greater than a predetermined value.

The control apparatus described above adjusts the gain when the differential reaches equal to or greater than the predetermined value, thereby stabilizing the control of motor. In this connection, the predetermined value is representative of a dead zone to be described later. When the differential of steering torque is less than the dead zone, the same control as conventional one is conducted.

The present invention is also considered to be a control method, which controls a motor for applying steering assist force to a steering line at least according to steering torque of the steering line detected by a steering torque sensor and motor current detected by a current detector. The control method includes steps for controlling the motor in the following manner: setting target current for driving the motor according to the steering torque, computing a deviation between target current and actual current, executing at least proportional and integral control for the deviation and adjusting the deviation when sudden steering is detected.

The control apparatus, which adjusts a deviation during sudden steering, can improve the response of motor.

Improvement in the response of motor during sudden steering, which improves the response during low speed running of a vehicle, can provide better steering feeling, since the motor provides appropriate assistance even if sudden steering is made. Also the improvement, which restricts vibration occurring as a result of sudden steering during very low speed maneuvering of a vehicle, can suppress noise and vibration (mechanical vibration) resulting from the oscillation of motor current.

In this connection, adjustment of gain or adjustment of deviation should be conducted according to a degree of sudden steering. For example, it is preferable to control a second gain of adjuster according to a differential of steering torque, to be described later. The reason for it is that it is possible to perform control responsive to a degree of sudden steering.

It may also be possible that the control apparatus has a block for making a judgment on sudden steering. In this connection, a dead zone to be described later has a characteristics that the dead zone serves as a threshold, based on which a judgment on whether steering is normal or sudden is made. An attenuator to be described later, which determines a gain based on a map having the dead zone, is entitled to a function for making a judgment on sudden steering.

DESCRIPTION OF THE PREFERRED EMBODIMENTS

An embodiment of the control apparatus according to the present invention along with an electric power steering system is now be described referring to the accompanying drawings.

Figure 1:
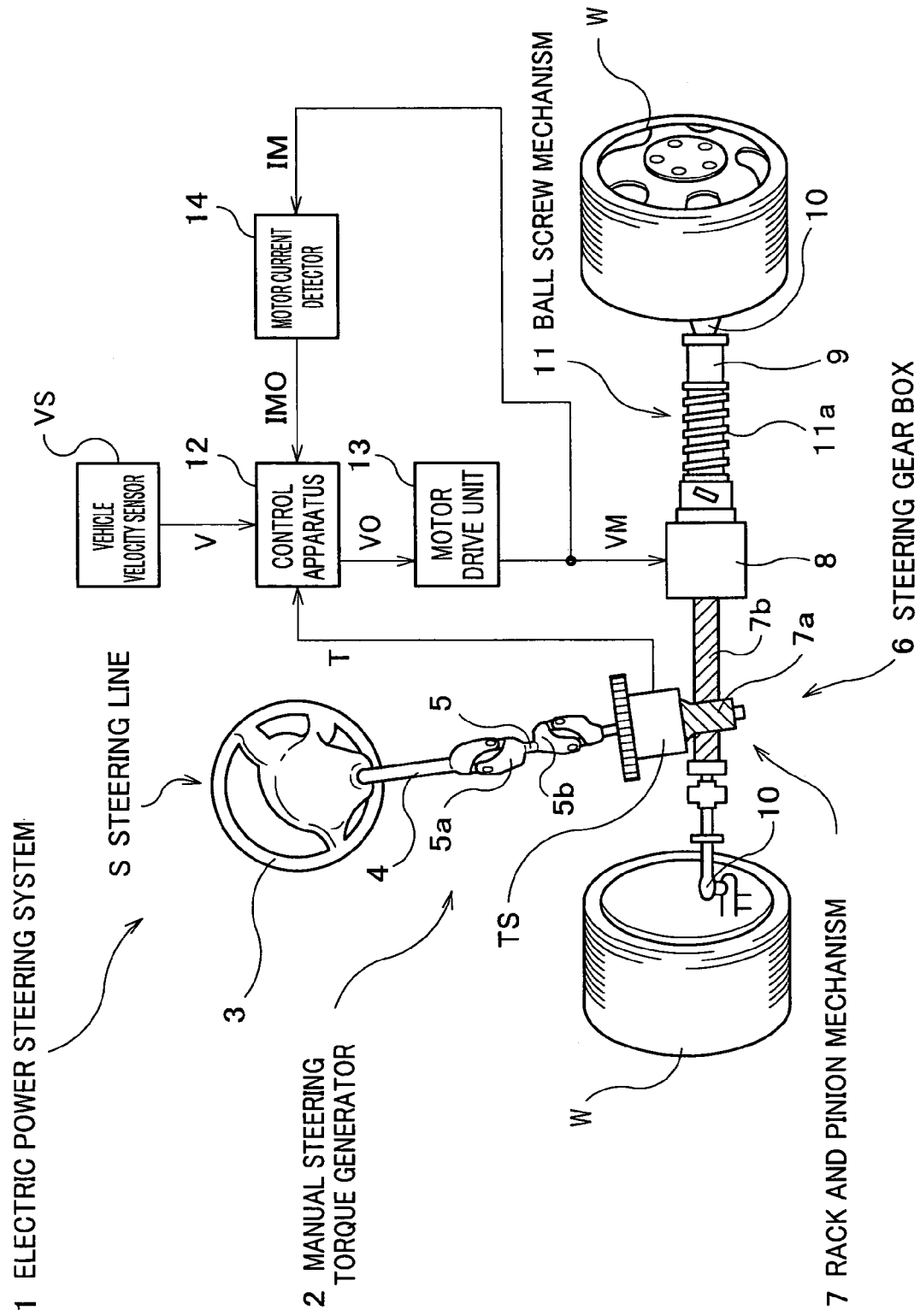
FIG. 1 is a schematic diagram illustrating overall structure of an electric power steering system of the present embodiment.

An overall structure of an electric power steering system 1 is described referring to FIG. 1. FIG. 1 is a schematic diagram illustrating overall structure of the electric power steering system, to which the control apparatus according to the present embodiment is applied.

The electric power steering system 1, which has a steering line S ranging from a steering wheel 3 to steerable wheels W, assists steering torque produced by a manual steering torque generator 2. A motor drive unit 13, which generates motor voltage VM based upon a motor control signal VO delivered by a control apparatus 12, drives a motor 8 according to the motor voltage VM. In this way, the motor 8 generates assist steering torque (assist steering force), thereby relieving manual steering torque produced by the manual steering torque generator 2.

In the manual steering torque generator 2, a pinion 7a of a rack & pinion mechanism 7 situated in a steering gear box 6 is coupled via a connecting shaft 5 with a steering shaft 4, which is formed integrally with the steering wheel 3. The connecting shaft 5 has universal joints 5a and 5b at both ends thereof. The rack & pinion mechanism 7, which has rack teeth 7b formed around a rack shaft 9 to mesh with the pinion 7a, converts the rotational movement of pinion 7a into the linearly reciprocating movement of rack shaft 9 in a lateral direction relative to the direction of vehicular travel. Forward steerable wheels W are connected to the rack shaft 9 via tie rods 10.

The motor 8 is disposed on the rack shaft 9 coaxially so as to generate assist steering force (torque). The electric power steering system 1 converts the rotation of motor 8 into thrust force via a ball screw mechanism 11 situated on the rack shaft 9 coaxially, thereby exerting the thrust force on the rack shaft 9, more specifically a ball screw shaft 11a.

The control apparatus 12 receives a vehicle velocity signal V detected by a vehicle velocity sensor VS, a steering torque signal T detected by a steering torque sensor TS and a motor current signal IMO detected by a motor current detector 14. The control apparatus 12 determines the magnitude and direction of motor current IM to be supplied to the motor 8 based upon the signals V, T and IMO, delivering a motor control signal VO to the motor drive unit 13. The control apparatus 12 further judges based upon the steering torque signal T and motor current signal IMO whether or not the electric power steering system 1 requires an assist, controlling the motor 8 accordingly.

The vehicle velocity sensor VS detects the velocity of a vehicle by counting the number of pulses per unit time and transmits a vehicle velocity signal V, which is an analogue electric signal representative of a detected number of pulses, to the control apparatus 12. In this connection, another existing sensor such as one used for controlling brake locking or traction of steerable wheels may be used alternatively instead of a dedicated sensor, concurrently with the vehicle velocity sensor VS.

The steering torque sensor TS, which is disposed in the steering gear box 6, detects the magnitude and direction of steering torque exerted manually by a driver. The steering torque sensor TS then transmits a steering torque signal T, which is an analogue electric signal representative of detected steering torque, to the control apparatus 12. The steering torque signal T includes both magnitude and direction of manual steering torque. Plus and minus signs identify the direction of steering torque, indicating clockwise and counterclockwise directions by plus and minus signs, respectively.

The motor current detector 14, which has a resister or a Hall element electrically connected to the motor 8 in series, detects the magnitude and direction of motor current IM actually flowing into the motor 8. The motor current detector 14 sends a motor current signal IMO, which is representative of the motor current IM, to the control apparatus 12 for negative feedback. The motor current signal IMO includes the information on the magnitude and direction (direction of assist steering torque) of motor current. Plus and minus signs of motor current signal IMO identify a direction of current, indicating clockwise and counterclockwise in terms of assist directions by plus and minus signs, respectively.

The motor drive unit 13 imposes a motor voltage VM on the motor 8 according to a motor control signal VO, thereby driving the motor 8. The motor drive unit 13 includes a bridge circuit, which has four switching elements, power field effect transistors (FET) 13a, 13b, 13c and 13d and source voltage (12V) 13e. When a motor control signal VO enters gates G1, G2, G3 and G4 of the power FET's 13a, 13b, 13c and 13d, respectively, a motor voltage VM imposed on the motor 8 according to the motor control signal VO. Motor current IM then flows into the motor 8, which generates assist steering torque proportional to the motor current IM. The operation of motor drive unit 13 is to be described later.

Figure 2:
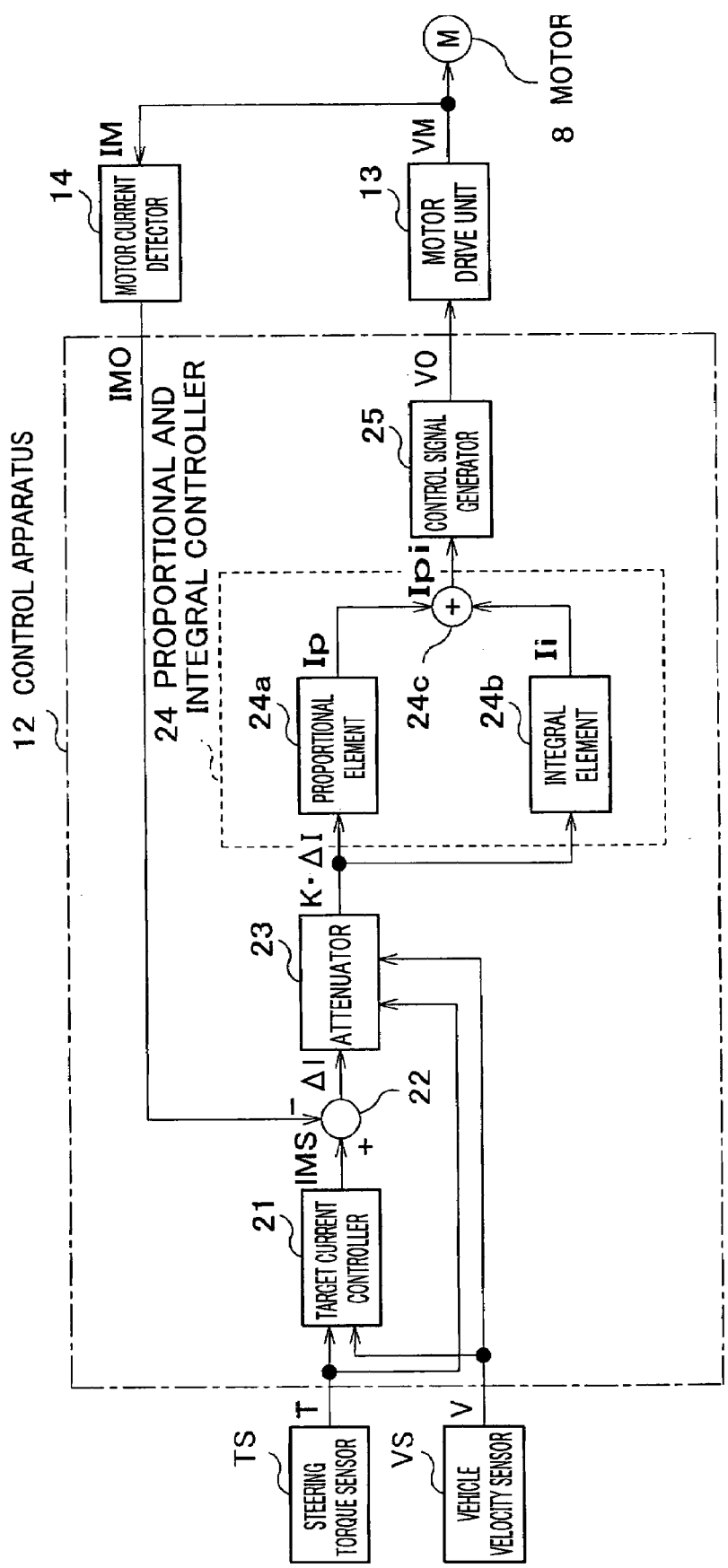
FIG. 2 is a block diagram illustrating a control apparatus shown in FIG. 1.

The structure of control apparatus 12 is described referring to FIG. 2. FIG. 2 is a block diagram illustrating a control apparatus shown in FIG. 1.

The control apparatus 12 including a microcomputer (not shown), which reads out a program stored in a read only memory (ROM, not shown) and executes modules such as a target current controller 21 and a deviation calculator 22, controls an electric power steering system 1. The control apparatus 12 includes the following: an input/output port for signals, information and commands; an AD converter for converting analogue signals into digital signals for a microcomputer; and a DA converter for converting the digital signals processed by the microcomputer into analogue signals.

The control apparatus 12 further includes a target current controller 21, the deviation calculator 22, an attenuator 23, a proportional and integral controller 24 and a control signal generator 25. The control apparatus 12, which generates assist steering torque, is tailored to execute feedback control for the motor 8.

The target current controller 21, which receives a steering torque signal T delivered by a steering torque sensor TS and a vehicle velocity signal V delivered by a vehicle velocity sensor VS, determines a target current signal IMS according to the signals T and V. The target current signal IMS contains the information, based on which a motor current to be supplied to the motor 8 is determined. In this connection, a value is assigned for the target current signal IMS in the following manner. When a torque signal T is around zero, a target current signal IMS of zero is assigned as a value for a dead zone. On the other hand, when a torque signal T reaches equal to or greater than a predetermined value, a target current signal IMS is assigned, which increases according to the torque signal T. Also a vehicle velocity signal V is taken into account when a target current signal IMS is determined. In a case of low speed running of a vehicle where larger reaction force is exerted by a road surface, a larger target current signal IMS is assigned. On the other hand, in a case of high speed running, a smaller target current signal IMS is assigned so as to achieve the running stability of vehicle. In this connection, a target current signal IMS is determined in order that it cannot command supply of current exceeding a maximum current allowed for the motor 8.

The deviation calculator 22, which receives a target current signal IMS from the target current controller 21 and a motor current signal IMO from the motor current detector 14, computes a deviation ΔI between the IMS and IMO.

The attenuator 23 is able to adjust a deviation ΔI varying an attenuator gain K according to a vehicle velocity signal V. The attenuator 23 is also able to adjust the gain K according to a differential ΔT of steering torque, when the differential ΔT reaches equal to or greater than a predetermined value (dead zone DZ). This can also be described in the following manner that the attenuator 23 is able to adjust the deviation ΔI when sudden steering is made. The attenuator 23 includes a deviation adjuster and a gain adjuster in the appended claims.

Figure 3:
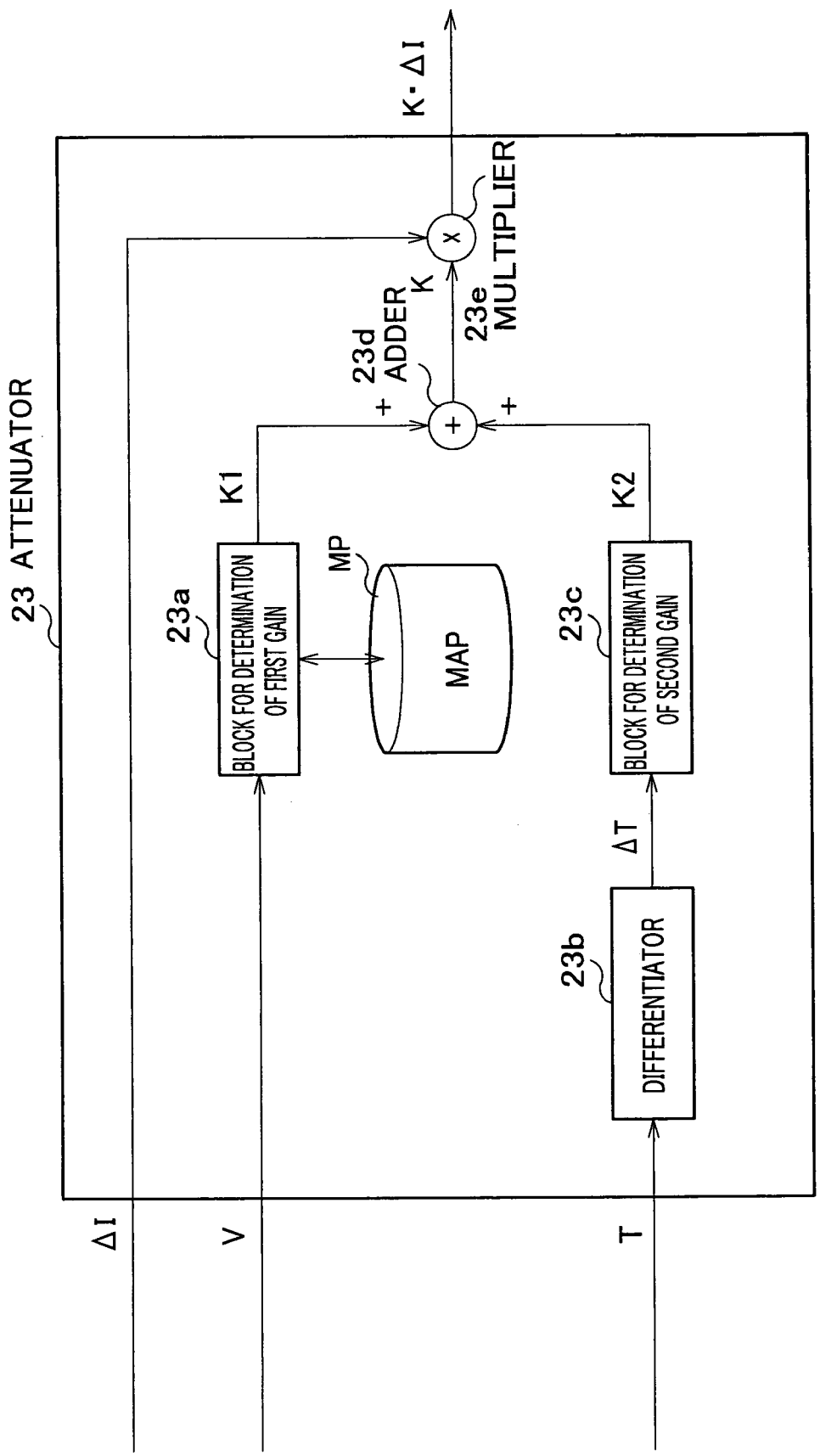
FIG. 3 is a diagram showing blocks of attenuator shown in FIG. 2.
Figure 4A:
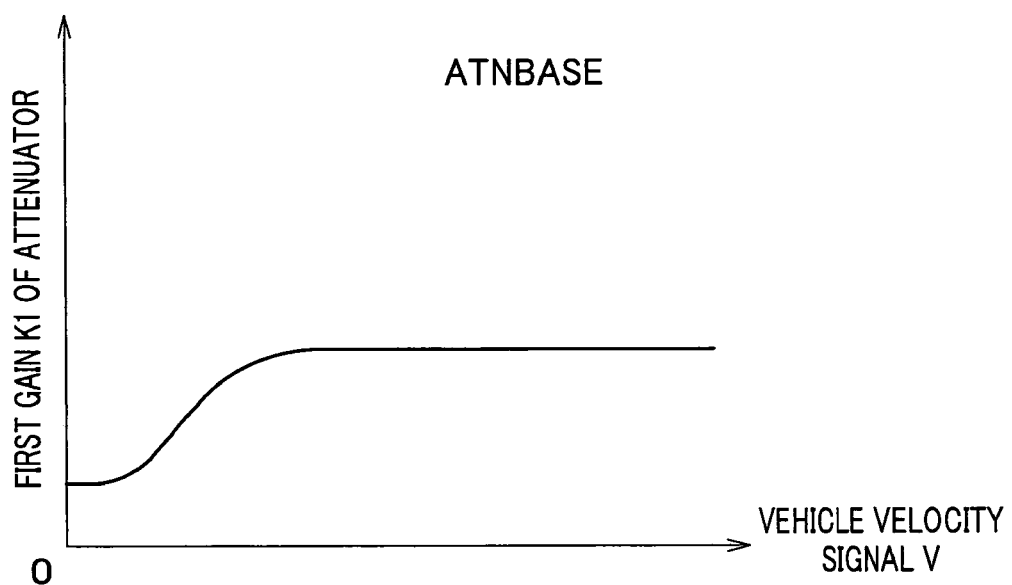
FIG. 4A is a figure showing the relationship between a vehicle velocity signal and a first gain of attenuator.
Figure 4B:
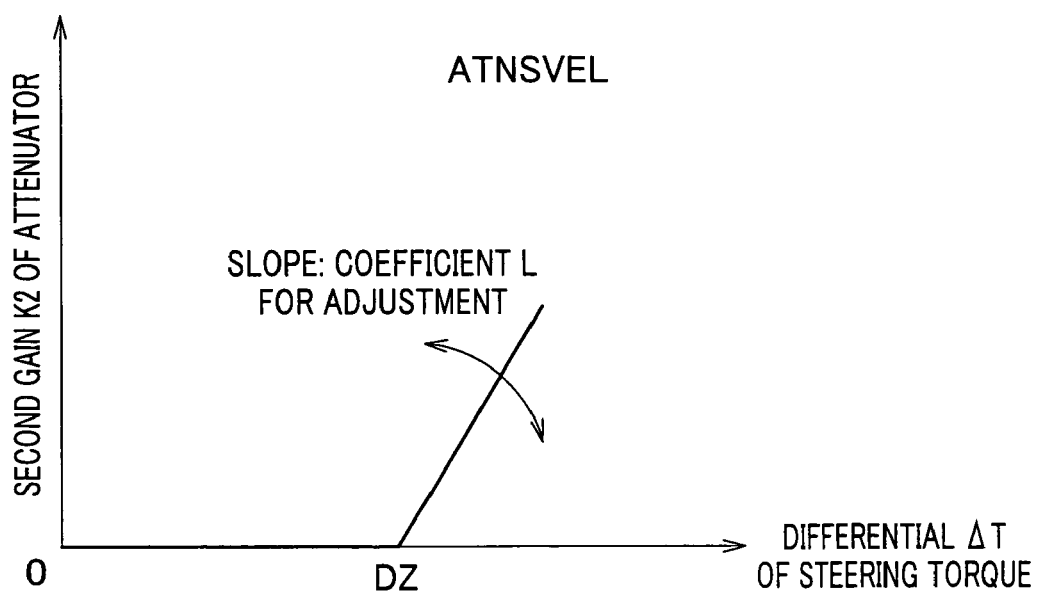
FIG. 4B is a figure showing the relationship between a differential of steering torque and a second gain of attenuator.

The attenuator 23 is further described referring to FIGS. 3 and 4. FIG. 3 is a block diagram illustrating an attenuator shown in FIG. 2. FIG. 4A is a figure showing the relationship between a vehicle velocity signal and a first gain of attenuator, describing contents of a map MP in FIG. 3. FIG. 4B is a figure showing the relationship between a differential of steering torque and a second gain of attenuator.

The attenuator 23 shown in FIG. 3 includes a block 23a for determination of first gain, a differentiator 23b, a block 23c for determination of second gain, an adder 23d and a multiplier 23e. The block 23a determines a first gain K1 of attenuator according to a vehicle velocity signal V. The differentiator 23b computes a differential ΔT of steering torque based on a steering torque signal T. The block 23c for determination of second gain determines a second gain K2 of attenuator according to a differential ΔT. The adder 23d computes an attenuator gain K adding the first and second gains K1 and K2. The multiplier 23e multiplies a deviation ΔI by an attenuator gain K.

An attenuator gain K is a summation of first and second gains K1 and K2 of attenuator represented by an expression (1).

$$K=K1+K2 \quad (1)$$

The relationship between a second gain K2 of attenuator and a differential ΔT of steering torque is represented by an expression (2). L is a coefficient for adjustment and DZ is a dead zone.

$$K2=L\times(\Delta T-DZ) \quad (2)$$

When ΔT is less than DZ (ΔT<DZ), K2 is set to be zero (K2=0).

The first gain K1 (ATNBASE) of attenuator is defined as shown in FIG. 4A. The gain KI is set to be smaller as a vehicle velocity decreases. The second gain K2 (ATNSVEL) is set according to a differential ΔT of steering torque as shown in FIG. 4B. FIG. 4A shows contents of a map MP shown in FIG. 3. The coefficient L and dead zone DZ are determined based on experimental data and the like. In this connection, the second gain K2 increases according to the coefficient L. The dead zone DZ will eliminate adverse effect of noise in the variation of differential ΔT of steering torque, thereby enabling stable control.

The proportional and integral controller 24 includes a proportional element 24a, an integral element 24b and an adder 24c. The proportional element 24a computes a proportional signal Ip by executing proportional processing for a deviation K×ΔI. The integral element 24b computes an integral signal Ii by executing integral processing for a deviation K×ΔI. The adder 24c produces a proportional and integral signal Ipi by adding the signals Ip and Ii. Alternatively, it may be possible to add a differential element for a deviation K×ΔI and select a PID controller instead of the proportional and integral controller 24.

A control signal generator 25 generates a PWM signal, an on-signal and an off-signal, which are correlated with the direction and magnitude of motor current IM.

Figure 5:
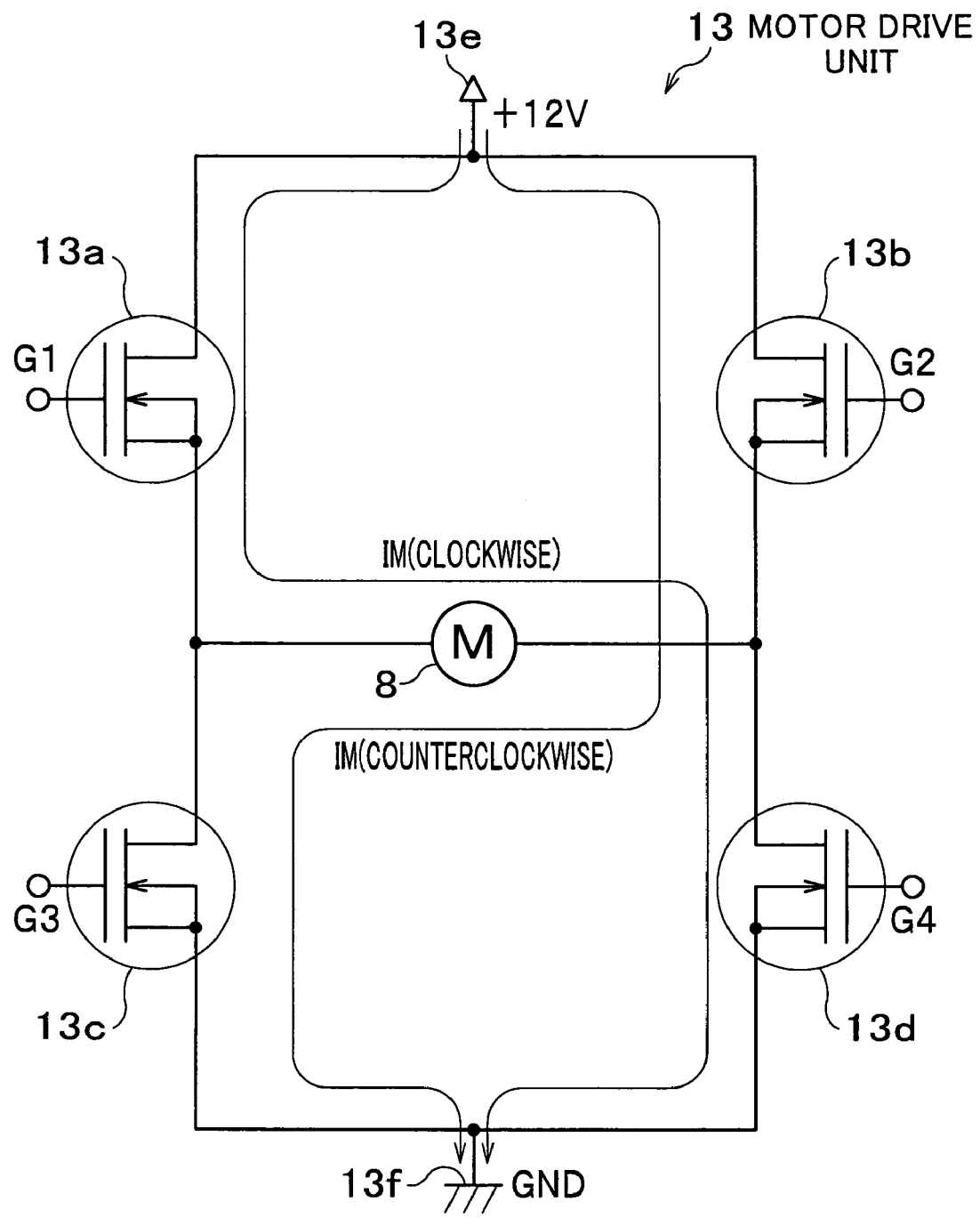
FIG. 5 is a circuit diagram showing a motor drive unit shown in FIG. 1.

The PWM signal, on-signal and off-signal are described referring to FIG. 5.

The PWM signal, which enters the gate GI of a power FET 13a or the gate G2 of a power FET 13b of motor drive unit 13, executes PWM drive for the power FET 13a or 13b according to the magnitude of a deviation K×ΔI. The polarity of a target current signal IMS selects a gate, G1 or G2, to which the PWM signal enters. The on-signal and off-signal command turning on and off of a power FET, respectively. The operation of a power FET with a PWM signal, on-signal and off-signal is described. One of the gates G1 and G2, which the PWM signal does not enter, receives the off-signal, and one of power FET's 13a and 13b is turned off. When the PWM signal enters the gate G1, the on-signal enters a gate G4 of power FET 13d and the power FET 13d is turned on. When the off-signal enters the gate G1, the off-signal enters the gate G4, and the power FET 13d is turned off. On the other hand, when the PWM signal enters the gate G2, the on-signal enters a gate G3 of power FET 13c and the power FET 13c is turned on. When the off-signal enters the gate G2, the off-signal enters the gate G3 and the power FET 13c is turned off. In this connection, a motor control signal VO includes a PWM signal, an on-signal and an off-signal supplied to the gates G1–G4 of motor drive unit 13

The circuit of motor drive unit 13 is described referring to FIG. 5. FIG. 5 is a diagram showing a circuit of motor drive unit.

The motor drive unit 13, which has a bridge circuit with four power FET's 13a, 13b, 13c and 13d, is supplied with a voltage of 12V by a power source 13e. The motor 8 is electrically connected not only to the power FET's 13a and 13d in series but also to the power FET's 13b and 13c in series. The power FET 13a or 13b, which receives a PWM signal or an off-signal at a gate G1 or G2, is turned on when a logical level meets one as a result of receiving the PWM signal. The power FET 13c or 13d, which receives an on-signal or an off-signal at a gate G3 or G4, is turned on when it receives the on-signal. A combination of power FET's 13a and 13d executes PWM drive for the motor 8 in a direction of positive direction, which coincides with generation of assist steering torque in a clockwise direction. The other combination of power FET's 13b and 13c drives the motor 8 in a reverse direction, generating assist steering torque in a counterclockwise direction. A motor voltage VM imposed on the motor 8 is determined according to a duty ratio of PWM signal. Motor current IM flowing into the motor 8 is correlated with the motor voltage VM. In a case where the duty ratio of PWM signal 7 (logical level of 1) to 3 (logical level of 0), an average of 8.4V is imposed on the motor 8. The average voltage is computed by multiplying the voltage of power source by the duty ratio: $12V \times (7/10) = 8.4$.

Figure 6:
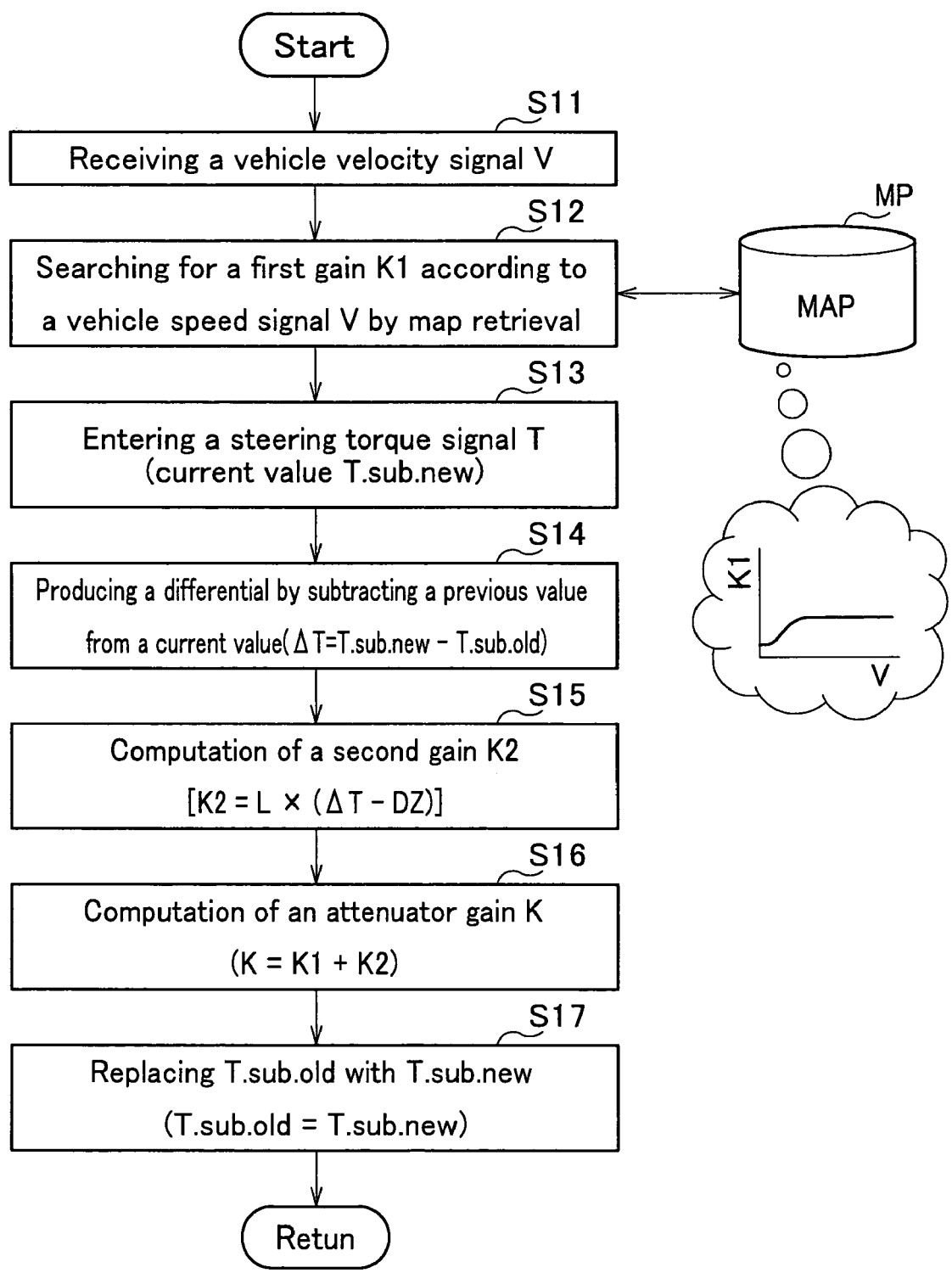
FIG. 6 is a flow chart showing a flow to determine an attenuator gain.

The operation of an electric power steering system 1 is now described referring to FIGS. 1–6. FIG. 6 is a flow chart showing steps for determining an attenuator gain K.

A control apparatus 12 for an electric power steering system conducts continuous monitoring. A steering torque sensor TS monitors steering torque including the direction thereof, a vehicle velocity sensor VS monitors vehicle velocity and a motor current detector 14 monitors motor current. A steering torque signal T detected by the steering torque sensor TS, a vehicle velocity signal V detected by the vehicle velocity sensor VS and a motor current signal IMO detected by the motor current detector 14 experience digital processes in the control apparatus 12.

When a driver make steering operation, a target current controller 21 of the control apparatus 12 determines a target current signal IMS according to a steering torque signal T and a vehicle velocity signal V. Subsequently, a deviation calculator 22 computes a deviation $\Delta I$ between target current signal IMS and motor current signal IMO.

A multiplier 23e of attenuator 23 adjusts the deviation $\Delta I$ by multiplying by an attenuator gain K, thereby producing an adjusted product of $K \times \Delta I$. The attenuator gain K, which is used for the multiplication, results from a summation of a first gain K1 of attenuator according to a vehicle velocity signal V and a second gain K2 of attenuator according to a differential $\Delta T$ of steering torque, shown as ATNBASE in FIG. 4A and shown as ATNSVEL in FIG. 4B, respectively. In this way, introduction of the first gain K1 of attenuator contributes to setting an attenuator gain K so that it takes a smaller value during low speed running but a larger value at high speed running of a vehicle. In this connection, an attenuator gain K of this type, in which a first gain K1 of attenuator is determined according to a vehicle velocity signal V as described above, achieves a control principle that an control apparatus 12 provides not only a better response during high speed running but also quietness during low speed running of a vehicle.

A deviation of $K \times \Delta I$ processed at an attenuator 23 subsequently undergoes processes executed by a proportional element 24a and an integral element 24b of proportional and integral controller 24. An adder 24c makes a summation of the resultant proportional signal Ip and integral signal Ii, thereby producing a proportional and integral signal Ipi. A control signal generator 25 generates a PWM signal, an on-signal and an off-signal, which are correlated with the direction and magnitude of motor current IM to be supplied to a motor 8. A motor drive unit 13 drives the motor 8 receiving the signals.

The attenuator 23 in a control apparatus 12 is adapted so that a first gain K1 of attenuator is smaller during low speed running of a vehicle. This leads to achieving quietness during low speed running when engine and wind noises are relatively low, since generation of noise by a motor 8 is restrained while the minimum response required for low speed running is maintained. However, the approach described above implies that a response obtained for low speed running of a vehicle, especially very low speed maneuvering or stopping, is adapted to be relatively poor, when large reaction force is exerted by a road surface. In this way, when sudden steering is made during low speed running of a vehicle, the response of motor 8 decreases, adversely affecting steering feeling.

Furthermore, if a driver makes sudden steering during very low maneuvering of a vehicle or steering while the vehicle is at a standstill, driving of the motor 8 is not able to follow steering operation, resulting in output saturation. Since it is followed by a prolonged period of time when a deviation $\Delta I$ takes a large value, an integral signal Ii processed in an integral element 24b takes a large value and thereby the control falls unstable. As a result, the current supplied to the motor 8 becomes unstable and irritating noise occurs accordingly. Or if it does not develop so far, noise and vibration are unavoidable. In this way, an effort for lowering the noise of motor 8 during low speed running of a vehicle leads to generation of noise to the contrary.

An attenuator 23 according to the present invention employs a second gain K2 of attenuator, which is added to a first gain K1 of attenuator, so that the demerits described above can be eliminated. As described before, the second gain K2 of attenuator is adapted to be larger as a differential $\Delta T$ of steering torque increases as shown in FIG. 4B, which is related to speed of steering operation made by a driver. In this way, when a driver make sudden steering (fast steering) during low speed running of a vehicle, including very low maneuvering and stopping, a differential $\Delta T$ of steering torque reaches equal to or greater than a dead zone DZ and thereby a block 23c for determination of second gain determines a larger second gain K2 of attenuator. Consequently, an attenuator gain K, which is multiplied for a deviation $\Delta I$, is adapted to be larger than that of normal low speed running of a vehicle when fast steering is not made.

Since the deviation ΔI is adjusted to be a larger value compared with that of the normal low speed running, a better response for sudden steering is achieved and thereby driving of the motor 8 is improved to better follow a target value. This leads to improvement of steering feeling. Also the output saturation of motor 8 does not last long any more, which has been typical in a conventional approach while a vehicle is maneuvering at very low speed. In this way, it is possible to prevent unstable control caused by a large value of integral signal Ii. Therefore, a control apparatus 12 restricts occurrence of oscillation of motor current, which causes noise and mechanical vibration, thereby eliminating a chance of generating irritating noise.

The control apparatus 12 computes an attenuator gain K according to a flow chart shown in FIG. 6. A block 23a for determination of first gain receives a vehicle velocity signal V (step S11) and retrieves a map MP shown in FIGS. 3 and 4A to obtain a first gain K1 of attenuator according to the vehicle velocity signal V (step S12). A differentiator 23b receives a steering torque signal T (step S13), which is stored as a current value T.sub.new. At a step 14, the differentiator 23b computes a differential ΔT of steering torque with regard to time by subtracting previous value T.sub.old from T.sub.new. And at a step 15, a block 23c for determination of second gain computes a second gain K2 of attenuator: K2=L×(ΔT−DZ). In this connection, the second gain K2 of attenuator increases after a differential ΔT of steering torque reaches equal to or greater than a dead zone DZ as shown in FIG. 4B. At a step S16, an adder 23d computes an attenuator gain K: K=K1+K2. Subsequently, the control apparatus 12 continues the flow replacing T.sub.old with T.sub.new (step S17).

The control apparatus 12 according to the present invention can provides an electric power steering system 1 with the following advantages. The electric power steering system 1 obtains a good response during high speed running and quietness during low speed running of a vehicle. The control apparatus 12 improves steering feeling with an enhanced response even if a driver makes sudden steering (very fast steering) during low speed running. Furthermore, even if a driver make sudden steering during very low maneuvering or stopping of a vehicle, the control apparatus 12 can prevent noise such as irritating noise and vibration, since the enhanced response solves instability of control due to output saturation. Introduction of a dead zone DZ enables stable control free from noise in a steering torque signal T. In this connection, low speed running of a vehicle refers to velocity less than or equal to 10 km/h. Also very low speed maneuvering of a vehicle refers to velocity less than or equal to 5 km/h.

It will now be appreciated from the foregoing description that the present invention is not limited to the particularly illustrated embodiment discussed above and may be carried out in various modified forms. For example, it may be possible to adapt a first gain K1 of attenuator to be constant and conduct control for sudden steering with a second gain K2 of attenuator.

A map MP shown in FIGS. 3 and 4B, by which a second gain K2 of attenuator is determined according to a differential ΔT of steering torque, employs a dead zone DZ to achieve stable control. It is alternatively possible to select a second gain K2 of attenuator, which increases quadratically or exponentially, instead of the dead zone DZ. These curves allow a second gain K2 of attenuator to take a smaller value while a differential ΔT of steering torque is small. This approach also achieves stable control. It is also may be possible to adopt another approach which eliminates the dead zone DZ shown in FIG. 4b.

It may also be possible to incorporate vehicle velocity into a block 23c for determination of second gain shown in FIG. 3 in order for a second gain K2 of attenuator to take a larger value, if the following conditions are simultaneously met. One is that a vehicle is maneuvering at very low speed or at a standstill. The other is that a differential ΔT of steering torque is equal to or greater than a dead zone DZ. In this way, it is possible to improve driving stability during high speed cruising on an expressway since the block 23c can provide an appropriate second gain K2 for this case too.

In the embodiment, a second gain K2 of attenuator is determined according to a differential ΔT of steering torque; in other words, improvement of response of a motor 8 at sudden steering operation is accomplished according to a steering torque signal T. It may be possible to achieve the improvement according to the movement responsive to a steering wheel 3, which has less mechanical delay, such as the rotational speed of a steering shaft. It may also be possible to make a judgment on sudden steering according to a differential ΔI of deviation (a previous deviation minus a current deviation, a differential with regard to time).

What is claimed is:

1. A control apparatus for an electric power steering system, which controls a motor for applying assist steering torque to a steering line of a vehicle at least according to steering torque signal of the steering line detected by a steering torque sensor, vehicle velocity signal detected by a vehicle velocity sensor and motor current signal detected by a motor current detector, the control apparatus comprising:
    a target current controller that receives the steering torque signal and is operational to set target current signal for driving the motor according to the steering torque signal;
    a deviation calculator that receives the target current and motor current signals and is operational to compute a deviation between the target current and motor current signals;
    an attenuator that receives the deviation and adjusts the deviation by an attenuator gain; the attenuator including a first determinator that determines a first gain based on the vehicle velocity signal, a second determinator that determines a second gain based on a differential of the steering torque signal, and an adder that computes the attenuator gain by adding the first and second gains;
    a proportional element operational to execute proportional control for the motor according to the adjusted deviation; and
    an integral element operational to execute integral control for the motor according to the adjusted deviation.

2. A control apparatus according to claim 1 wherein the second determinator determines the second gain when the differential of the steering torque signal reaches equal to or greater than a predetermined value.

3. A method for controlling an electric power steering system, which controls a motor for applying assist steering torque to a steering line of a vehicle at least according to steering torque signal of the steering line detected by a steering torque sensor, vehicle velocity signal detected by a vehicle velocity sensor and motor current signal detected by a motor current detector, the method comprising the steps of:
    setting target current signal for driving the motor according to the steering torque signal;
    computing a deviation between the target current and motor current signals;

adjusting the deviation with an attenuator gain, the attenuator gain being determined by a first gain based on the vehicle velocity signal, a second gain based on a differential of the steering torque signal, and computing the attenuator gain by adding the first and second gains;

executing proportional control for the motor according to the adjusted deviation; and executing integral control for the motor according to the adjusted deviation.

* * * * *